United States Patent
Werner et al.

(10) Patent No.: US 6,725,725 B1
(45) Date of Patent: Apr. 27, 2004

(54) MICROMECHANICAL DIFFERENTIAL PRESSURE SENSOR DEVICE

(75) Inventors: Wolfgang Werner, München (DE); Hans-Jörg Timme, Ottobrunn (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/571,489

(22) Filed: May 15, 2000

Related U.S. Application Data

(63) Continuation of application No. PCT/DE98/03346, filed on Nov. 13, 1998.

(30) Foreign Application Priority Data

Nov. 13, 1997 (DE) .......................................... 197 50 131

(51) Int. Cl.$^7$ .............................. G01L 15/00; G01L 9/12
(52) U.S. Cl. ............................. 73/716; 73/715; 73/718; 73/724; 73/754; 361/283.4
(58) Field of Search ........................ 73/718, 716, 720, 73/721, 719, 724, 715, 736, 753, 754; 361/283, 283.1–283.4

(56) References Cited

U.S. PATENT DOCUMENTS

| | | | |
|---|---|---|---|
| 4,433,580 A | * 2/1984 | Tward | 73/718 |
| 4,565,096 A | * 1/1986 | Knecht | 73/718 |
| 4,578,735 A | * 3/1986 | Knecht et al. | 361/283.4 |
| 4,730,496 A | 3/1988 | Knecht et al. | |
| 4,790,192 A | * 12/1988 | Knecht et al. | 73/721 |
| 4,864,463 A | * 9/1989 | Shkedi et al. | 361/283.4 |
| 4,875,135 A | * 10/1989 | Bishop et al. | 361/283.4 |
| 5,257,542 A | * 11/1993 | Voss | 73/724 |
| 5,820,736 A | * 10/1998 | Bouziane et al. | 202/136 |

FOREIGN PATENT DOCUMENTS

| | | |
|---|---|---|
| DE | 28 37 642 | 4/1979 |
| EP | 0639761 A1 | 2/1995 |
| EP | 0 714 017 A1 | 5/1996 |
| JP | 0040072534 AA | 3/1992 |

OTHER PUBLICATIONS

Werthschützky: "Application of silicon sensors in process measuring devices for pressure measurements—current status and coming opportunities", tm—Technisches Messen 59 (1992), R. Oldenburg Verlag, pp. 340–346.

"MOS Integrated Silicon Pressure Sensor", Hiroshi Tanigawa et al., IEEE Transactions on Electron Devices, vol. ED–32, No. 7, Jul. 1985, pp. 1191–1195.

* cited by examiner

*Primary Examiner*—Edward Lefkowitz
*Assistant Examiner*—Marissa L Ferguson
(74) *Attorney, Agent, or Firm*—Laurence A. Greenberg; Werner H. Stemer; Ralph E. Locher

(57) ABSTRACT

A micromechanical differential pressure sensor device for measuring a pressure difference between two mutually separated spaces or media, in which two absolute pressure measuring devices are monolithically integrated on a single support substrate, in particular on a semiconductor chip. The absolute pressure measuring devices are preferably fabricated by surface micromachining.

9 Claims, 2 Drawing Sheets

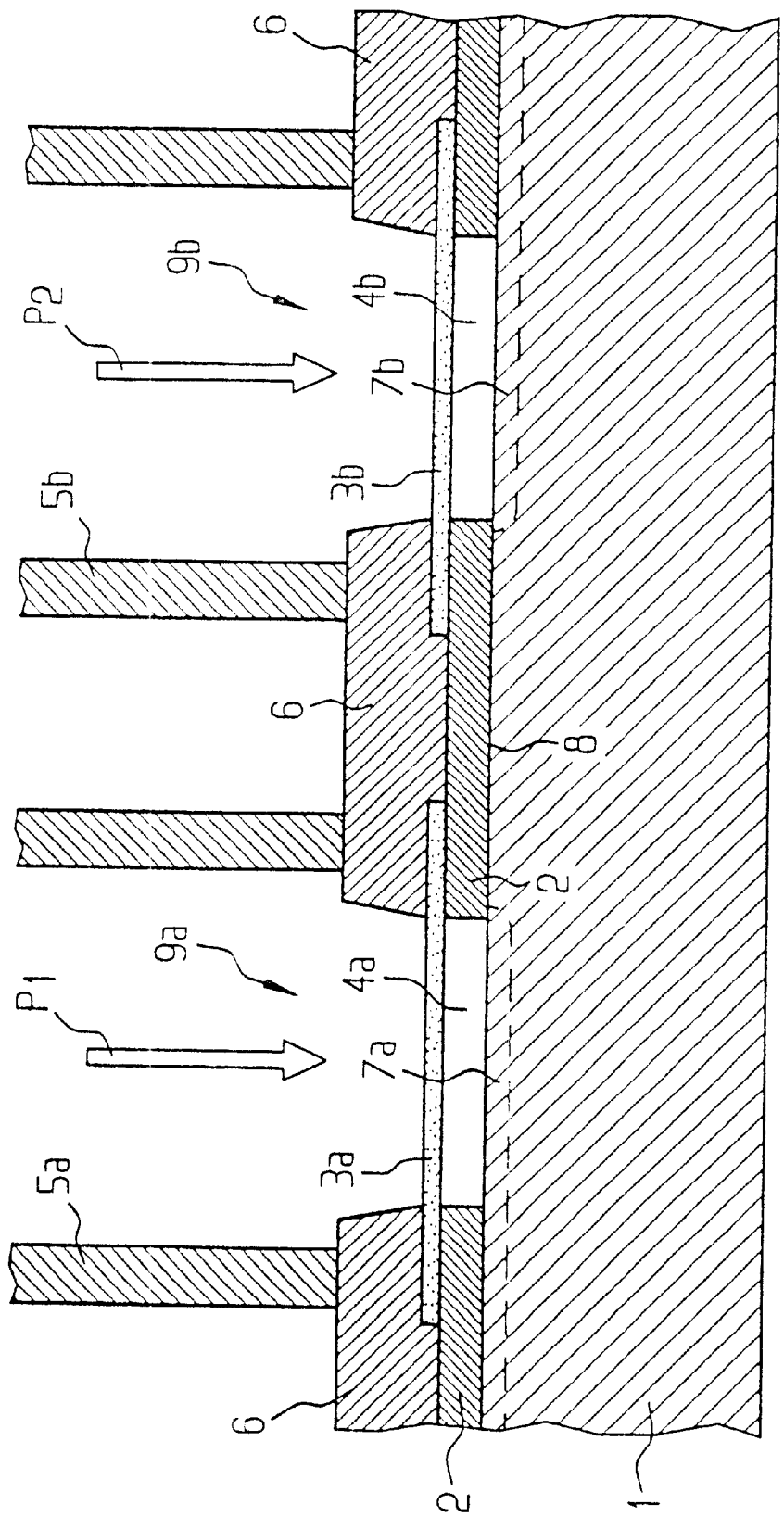

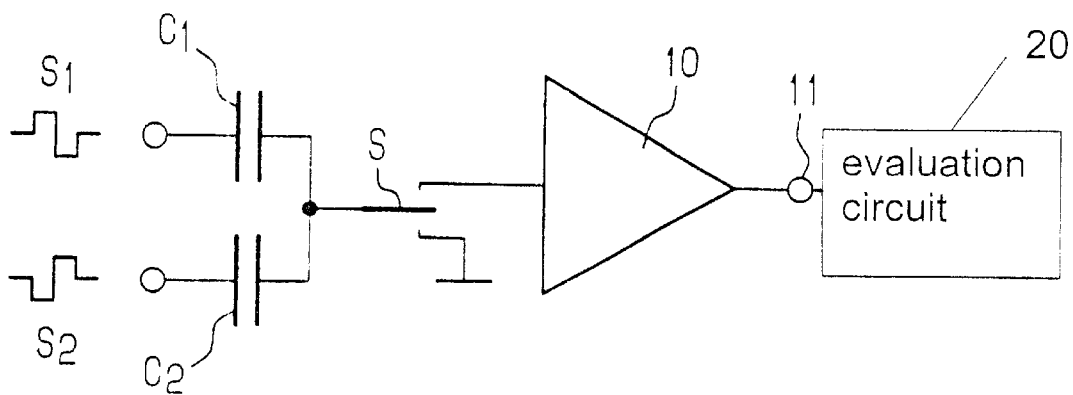
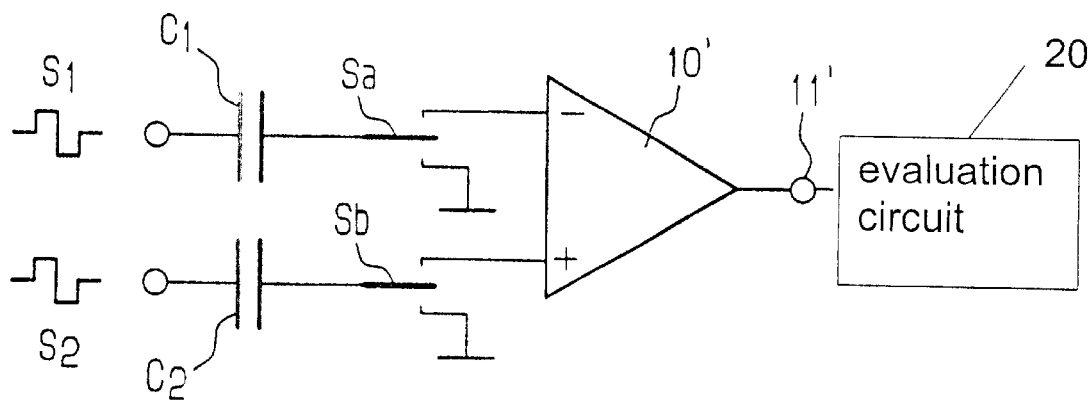

MICROMECHANICAL DIFFERENTIAL PRESSURE SENSOR DEVICE

CROSS-REFERENCE TO RELATED APPLICATION

This is a continuation of copending International Application PCT/DE98/03346, filed Nov. 13, 1998, which designated the United States.

Background of the Invention

Field of the Invention

The invention relates to a micromechanical differential pressure sensor device for measuring a pressure difference in two mutually separated spaces or media.

The measurement of differential pressures, that is to say a difference between the pressures prevailing in two mutually separated spaces or media, is of great importance for many applications of pressure sensors. In this case, it generally does not suffice to measure two pressures $p_1$ and $p_2$ in absolute terms using two separate pressure sensors and then to subtract the measured values obtained from one another. The reason for this is that the absolute pressure measuring devices that are generally available have excessively low measuring accuracy which, in particular in the case of large pressure ranges or high absolute pressures but small differential pressures, does not suffice to yield the pressure difference $\Delta p = p_2 - p_1$ in a sufficiently accurate manner.

The measurement of the differential pressure $\Delta p = p_2 - p_1$ by using two independent absolute pressure sensors leads to considerable measurement errors in the case of small differential pressures (with reference to the measurement range of the absolute pressure sensors). Given a measurement error of the absolute pressure sensors of e.g. 1%, a differential pressure $\Delta p$ of e.g. 5% of the measurement range results in an error of as much as 28%.

In order to solve this problem, semiconductor differential pressure sensors have been proposed in which a single pressure-sensitive diaphragm is acted on by the first pressure $p_1$ from one side and by the second pressure $p_2$ from the other side. Consequently, in a configuration of this type, the diaphragm is deflected in accordance with the pressure difference $\Delta p = p_2 - p_1$ and thus enables corresponding measurement of this value.

The measuring accuracy of a differential pressure sensor of this type is dependent on the configuration of the sensor, that is to say the diaphragm, the sensing of the diaphragm deflection and the electrical and/or electronic evaluation, etc.

An essential problem with this solution approach, however, is that such semiconductor differential pressure sensors have to be fabricated using so-called bulk micromachining, in which the substrate material has to be completed removed (e.g. by etching) underneath the diaphragm. The corresponding production processes are generally incompatible with modern CMOS or bipolar semiconductor processes. Accordingly, it is difficult to integrate a complex evaluation circuit in addition to the pressure sensor device directly on the same semiconductor chip.

A further fundamental disadvantage of the "bulk micromachining solution" described above is that the differential pressure sensors react with pronounced sensitivity to the mounting and/or housing conditions. This problem is usually solved by a wafer bonding process (two wafers being bonded together) in which the system wafer, which bears the actual pressure sensor device, is bonded to a support wafer.

For their part, such support wafers may be composed of a semiconductor material or alternatively of thermally matched glasses or ceramics. Each support wafer has to be patterned either before or after the bonding process with the system wafer, to enable pressure coupling to the underside of the diaphragm. This patterning leads to alignment problems if it is carried out before the wafer bonding. On the other hand, if the patterning is carried out after the wafer bonding, then it has to be performed extremely carefully since the sensitive diaphragms can very easily be damaged, which either drastically reduces the production yield or else may possibly adversely affect the reliability and/or long-term stability of the pressure sensors.

U.S. Pat. No. 4,790,192 discloses a pressure sensor with a plurality of diaphragm sensors which are formed monolithically in a substrate, in which a support plate bearing the two monolithically formed diaphragms is provided with two holes, which plate has a feed of the medium that is to be checked with regard to the pressure to the diaphragm. The measurement is effected in this case by changes in the properties of sensors that are formed on the diaphragms and operate as strain gages.

SUMMARY OF THE INVENTION

It is accordingly an object of the invention to provide a micromechanical differential pressure sensor device which overcomes the above-mentioned disadvantages of the prior art devices of this general type, which can be fabricated in a technically simple manner and at the same time with a high production yield and has high reliability and long-term stability.

With the foregoing and other objects in view there is provided, in accordance with the invention, a micromechanical differential pressure sensor device for measuring a pressure difference between two mutually separated spaces, containing a single support substrate; two capacitive absolute pressure measuring devices monolithically integrated on the single support substrate; and pressure connection parts respectively extending from the two capacitive absolute pressure measuring devices via which the two mutually separated spaces and respective pressures intended to be measured can each be coupled to a respective one of the two capacitive absolute pressure measuring devices.

The object is achieved by a differential pressure sensor in which two capacitive absolute pressure measuring devices are monolithically integrated on a single support chip. The two capacitive absolute pressure measuring devices are fabricated simultaneously, preferably by surface micromachining.

On account of the monolithic integration of the two capacitive absolute pressure measuring devices, in particular the integration of the pressure sensor diaphragms on one and the same support chip, the absolute errors of the two absolute pressure measuring devices have essentially the same magnitude and, moreover, have the same sign. The measurement errors are consequently correlated and practically cancel one another out by virtue of the subtraction of the two measured pressure values while still in a measuring bridge at an input of a signal-processing evaluation circuit configuration.

In a particularly preferred embodiment of the differential pressure sensor according to the invention, each of the two capacitive absolute pressure measuring devices has a pressure connection part (chimney or hose connector), via which in each case one of the two spaces in which the pressure is intended to be measured can be coupled to the absolute pressure measuring device. This makes it possible, in a simple manner, for the two pressures to be passed separately from one another to the absolute pressure measuring devices.

In a particularly preferred embodiment of the differential pressure sensor device according to the invention, two mutually separated doped regions are formed in a single semiconductor chip. Disposed on a first main area of the semiconductor chip (e.g. an Si chip, for example containing an Si substrate by itself or an Si substrate with an Si epitaxial layer) is an insulating sacrificial layer (e.g. field oxide (Si oxide)) with a first and a second cutout, which reach down to the first main area of the semiconductor chip. The first cutout is assigned to the first doped region and the second cutout is assigned to the second doped region, these cutouts preferably each being situated altogether in the region of the associated doped region. The two cutouts are each covered in a gastight manner with an electrically conductive diaphragm (e.g. composed of a doped polysilicon), two mutually separated chambers thereby being formed which are each delimited by the first main area of the semiconductor chip, the associated diaphragm and the walls of the cutouts. The chambers are filled for example with air or a different gas or gas mixture or are provided with a vacuum. Each diaphragm forms, together with the associated doped region, a capacitive absolute pressure measuring device in which the diaphragm and the doped region constitute the two capacitor plates. It is advantageous for at least one of the two absolute pressure measuring devices to be assigned a pressure connection part (e.g. a chimney or a hose connector) which, placed directly on the edge of the absolute pressure measuring device, is connected to the edge in a gastight manner. Preferably, both absolute pressure measuring devices are each provided with such a pressure connection part.

In a further preferred development of the differential pressure sensor device according to the invention, an evaluation circuit configuration is formed in an integrated manner on the semiconductor chip, which evaluation circuit configuration is coupled to the two absolute pressure measuring devices, and receives and processes further the output signals of the absolute pressure measuring devices. In an advantageous manner, the difference between the two output signals of the two absolute pressure sensor devices is formed while still in an input bridge of the evaluation circuit configuration and only this differential signal is processed further by the evaluation circuit. By virtue of the subtraction of the pressure sensor signals as early as at the input of the evaluation circuit configuration, all errors caused by the evaluation circuit advantageously relate only to the differential signal $\Delta p$, but not to the individual measurements of the pressures $p_1$ and $p_2$.

The calibration of the differential pressure sensor device constructed from two monolithically integrated absolute pressure sensor devices is advantageously effected for the differential pressure characteristic curve. This advantageously makes it possible to compensate for possible differences in the two absolute pressure sensor devices with regard to offset and sensitivity.

With the foregoing and other objects in view there is further provided, in accordance with the invention, a method for fabricating a micromechanical differential pressure sensor device, which includes the steps of providing a single support substrate; fabricating, simultaneously using surface micromachining, two capacitive absolute pressure measuring devices monolithically integrated on the single support substrate; and forming pressure connection parts respectively extending from the two capacitive absolute pressure measuring devices via which two mutually separated spaces in which respective pressures intended to be measured can be coupled to a respective one of the two capacitive absolute pressure measuring devices.

Other features which are considered as characteristic for the invention are set forth in the appended claims.

Although the invention is illustrated and described herein as embodied in a micromechanical differential pressure sensor device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, partial sectional view through an exemplary embodiment according to the invention;

FIG. 2 is a circuit diagram of a first evaluation circuit configuration; and

FIG. 3 is a circuit diagram of a second evaluation circuit configuration.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a differential pressure sensor for a measurement of a difference between a first pressure $p_1$ and a second pressure $p_2$. The sensor has two mutually separated, mutually spaced apart, doped regions 7a (called "first doped region" below) and 7b (called "second doped region" below), so-called "doped wells", are formed in a silicon layer 1, adjacent to a first main area or surface area 8 of said silicon layer 1. The silicon layer 1 is e.g. a silicon substrate or a silicon epitaxial layer applied on a silicon substrate. The doping regions are fabricated for example by implantation and/or diffusion.

An electrically insulating layer 2 is applied on the first main area 8 of the silicon layer 1, the electrically insulating layer 2 having a first 4a and a second window 4b, in which the first main area 8 of the silicon layer 1 is uncovered. The electrically insulating layer 2 is composed for example of a field oxide (silicon oxide). The first 4a and the second window 4b are situated above the first 7a and above the second doped region 7b, respectively, as seen from the silicon layer 1. The first 4a and the second window 4b is covered in a gastight manner with a first 3a and a second electrically conductive diaphragm 3b, respectively, which are essentially composed of doped polysilicon, for example.

The "chambers" delimited by the side walls of the windows 4a and 4b, the main area 8 of the silicon layer 1 and the diaphragms 3a and 3b are filled e.g. with air or a different gas or gas mixture or are provided with a vacuum.

A further electrically insulating layer 6 (e.g. Si oxide or Si nitride) is applied on the electrically insulating layer 2 and on a region of overlap between the latter and the diaphragms 3a and 3b, in such a way that the diaphragms 3a and 3b remain free in the region of the windows 4a and 4b.

The first diaphragm 3a and the first doped region 7a and also the second diaphragm 3b and the second doped region 7b form a first and respectively a second "plate" capacitor with a pressure-dependent capacitance (dependent on the pressure on the associated diaphragm) $C_1(p_1)$ and $C_2(p_2)$, respectively. At the edges of the pressure sensor regions of these two absolute pressure sensor devices 9a and 9b each formed from the doped region 7a, 7b and from the diaphragm 4a, 4b, a respective pressure connection part (5a, 5b) e.g. a plastic chimney or a plastic hose connection, is fixed in a gastight manner on the further electrically insulating layer 6. The pressure connection parts 5a and 5b make it possible, in a simple manner, for the two pressures $p_1$, $p_2$ that are to be measured to be fed separately from one another to the respectively associated absolute pressure sensor devices 9a and 9b.

The circuit configuration which is illustrated schematically in FIG. 2 and serves for evaluating the two output signals of the absolute pressure sensor devices 9a, 9b is a so-called switched capacitor circuit for evaluating the signal $C_1–C_2$. In this case, the two capacitance elements $C_1$ and $C_2$ are driven by in-antiphase signals $S_1$ and $S_2$ and are fed via a switch S, to which in each case one connection of the capacitance elements $C_1$ and $C_2$ is passed, to a simple integrator 10 (e.g. of a sigma-delta converter), whose output 11 is connected to a further evaluation circuit 20. The circuit configuration and also the further evaluation circuit configuration 20 is advantageously integrated together with the differential pressure sensor device 9a, 9b on one and the same silicon chip. This can be realized in a simple manner, because the surface-micromechanical process steps are compatible with process steps for fabricating integrated circuits.

The circuit configuration which is illustrated schematically in FIG. 3 and serves for evaluating the two output signals of the absolute pressure sensor devices 9a, 9b is likewise a so-called switched capacitor circuit for evaluating the signal $C_1–C_2$. In this case, however, in contrast to the circuit configuration described above, the two capacitance elements $C_1$ and $C_2$ are driven by in-phase signals $S_1$ and $S_2$ and are fed via two separate switches Sa and Sb to a differential integrator 10' (e.g. of a sigma-delta converter), whose output 11' is connected to the further evaluation circuit 20. The statements made in connection with FIG. 2 are applicable with regard to the integration of the circuit configuration together with the differential pressure sensor device on one and the same silicon chip.

We claim:

1. A micromechanical differential pressure sensor device for measuring a pressure difference between two mutually separated spaces, comprising:
    a single support substrate;
    two capacitive absolute pressure measuring devices monolithically integrated on said single support substrate; and
    pressure connection parts respectively extending from said two capacitive absolute pressure measuring devices and coupling each of the two mutually separated spaces and respective pressures to be measured to a respective one of said two capacitive absolute pressure measuring devices.

2. The micromechanical differential pressure sensor device according to claim 1, wherein said pressure connection parts are two chimneys each projecting above one of said two capacitive absolute pressure measuring devices.

3. The micromechanical differential pressure sensor device according to claim 1,
    wherein said single support substrate is a semiconductor chip having a surface and mutually separated doped regions, including a first doped region and a second doped region;
    including an insulating sacrificial layer having a first cutout and a second cutout formed therein and disposed on said surface of said semiconductor chip, said first cutout being disposed over said first doped region and said second cutout being disposed over said second doped region and said second cutout being disposed over said second doped region; and
    diaphragms including a first electrically conductive diaphragm covering said first cutout in a gastight manner and a second electrically conductive diaphragm covering said second cutout in a gastight manner, two mutually separated chambers thereby being formed and each defined by said semiconductor chip, one of said diaphragms, and said insulating sacrificial with said first cutout and said second cutout, each of said diaphragms forms, together with an associated one of said doped regions one of said two capacitive absolute pressure measuring devices in which said diaphragms and said doped regions constitute capacitor plates.

4. The micromechanical differential pressure sensor device according to claim 3, wherein said two mutually separated chambers are filled with a substance selected from the group consisting of air, a different gas, and a gas mixture.

5. The micromechanical differential pressure sensor device according to claim 3,
    wherein said two capacitive absolute pressure measuring devices output two output signals; and
    including an evaluation circuit configuration integrated on said semiconductor chip, said evaluation circuit configuration coupled to said two capactive absolute pressure measuring devices and receives and processes the two output signals of said two capacitive absolute pressure measuring devices.

6. The micromechanical differential pressure sensor device according to claim 5, wherein said evaluation circuit configuration has an input bridge, which forms a difference between the two output signals of said two capacitive absolute pressure sensor devices resulting in a differential signal, and said evaluation circuit configuration processes further only the differential signal.

7. The micromechanical differential pressure sensor device according to claim 3, wherein said two mutually separated chambers are vacuumed chambers.

8. The micromechanical differential pressure sensor device according to claim 1, wherein said pressure connection parts are two connectors each projecting above one of said two capacitive absolute pressure measuring devices.

9. The micromechanical differential pressure sensor according to claim 8, wherein said connectors are hose shaped connectors.

* * * * *